M. M. GOBLE.
NUT LOCK.
APPLICATION FILED MAR. 23, 1914.
1,115,924.
Patented Nov. 3, 1914.
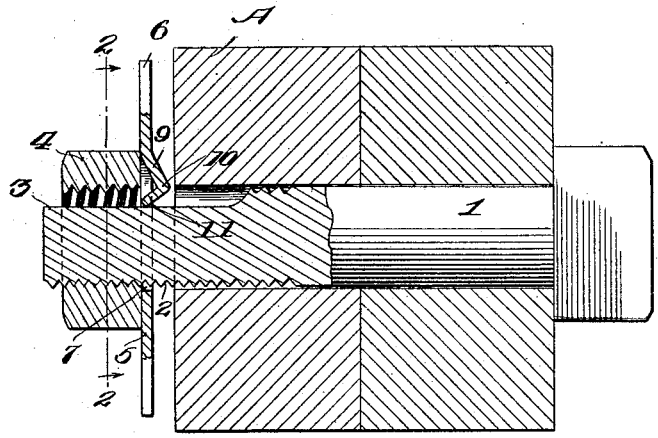
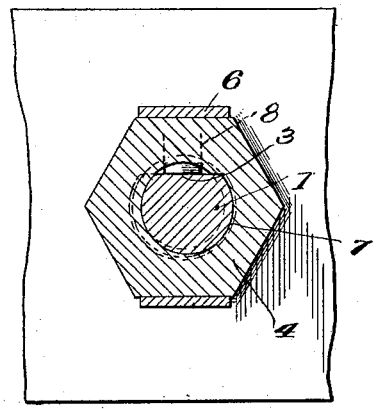
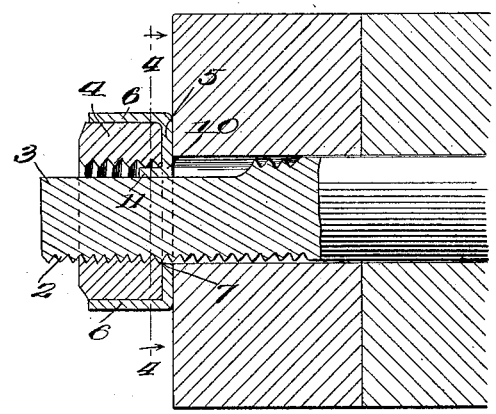
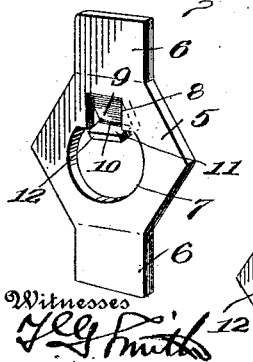
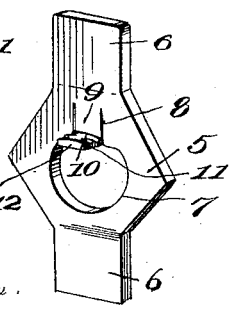
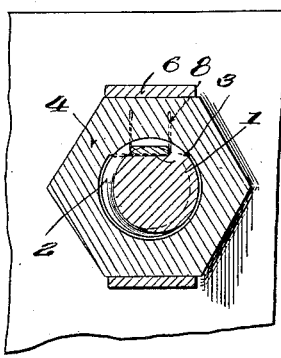
Inventor
M. M. Goble
Witnesses

UNITED STATES PATENT OFFICE.

MILTON M. GOBLE, OF GRAND RAPIDS, MICHIGAN.

NUT-LOCK.

1,115,924. Specification of Letters Patent. Patented Nov. 3, 1914.

Application filed March 23, 1914. Serial No. 826,585.

*To all whom it may concern:*

Be it known that I, MILTON M. GOBLE, citizen of the United States, residing at Grand Rapids, in the county of Kent and State of Michigan, have invented certain new and useful Improvements in Nut-Locks, of which the following is a specification.

This invention relates to nut locking devices and more particularly to an improvement in lock washers.

The washer of the present invention is of that type including a locking tongue which coöperates with the flattened side of a bolt and which is engaged and cut by the threads of the nut as the nut is turned upon the bolt. There are a number of lock washers of this general type which present the disadvantage that they must be held against the part to be secured as the nut is turned into place and even when so held will not be so firmly held by the nut against the said part to be secured as to provide against vibration. Such lock washers must be held against the part to be secured, due to the fact that if merely disposed upon the bolt and the nut is then turned, the nut will lock with the tongue of the washer before the washer can be fed or moved along the bolt into proper engagement with the said part.

It is therefore an aim of the present invention to provide a lock washer of such construction that it may be placed upon the bolt at any point and will be moved to position against the part to be secured, by the nut as the nut is turned and without any possibility of the nut locking with the tongue of the washer until the washer is securely in position against the said part.

It is also an aim of the present invention to so arrange the locking tongue of the washer that when engaged by the nut, it will exert a wedging action upon the nut, thereby canting the nut to a greater or less degree upon the bolt and causing the threads of the nut and bolt to firmly bind each other and thereby provide against the disastrous results of vibration.

In the accompanying drawings: Figure 1 is a longitudinal sectional view through a bolt and nut and the lock washer embodying the present invention, the said view illustrating the manner in which the washer may be moved along the bolt as the nut is rotated into place; Fig. 2 is a vertical transverse sectional view on the line 2—2 of Fig. 1; Fig. 3 is a view similar to Fig. 1, illustrating the nut tightened and locked; Fig. 4 is a vertical transverse sectional view on the line 4—4 of Fig. 3; Fig. 5 is a perspective view of the washer embodying the invention, the same being in its initial condition; Fig. 6 is a view similar to Fig. 5, but illustrating the condition of the locking tongue after the nut has been removed as also the washer.

Corresponding and like parts are referred to in the following description and indicated in all the views of the drawings by the same reference characters.

In the drawings, the numeral 1 indicates a bolt having the usual threaded portion 2 and provided with a flattened side 3 which extends a greater or less distance in the length of the threaded portion 2. The nut is indicated by the numeral 4 and is of the ordinary form.

The lock washer embodying the present invention comprises a body portion 5 which may have any desired marginal contour and which is provided with one or more nut engaging tongues 6 which are to be bent or struck down to engage one or more faces of the nut, whereby to hold the nut against rotation with respect to the washer. The washer 5 is provided with a bolt opening 7 and at one side of the bolt opening, the body portion of the washer is formed with parallel slits 8 located at opposite sides of a line passing through the axis of the opening. The material of which the washer is formed is stamped back between the slits 8 as indicated at 9 to form the shank of the locking tongue, the said portion 9 extending downwardly and rearwardly at an angle with respect to the plane of the washer and being of a length substantially equal to the length of either slit 8. The locking tongue, as a whole, is however, of greater length than the said portion 9 and it is bent transversely as at 10 to form a portion 11 which extends forwardly substantially at right angles to the portion 9. Stated, in other words the portion 11 is inclined downwardly and forwardly toward the plane of the washer and its forward edge 12 is located at the lower ends of the slits 8 and touches the plane of the forward face of the washer. By reference to Figs. 1, 3 and 5 of the drawings, it will be observed that the forward end 12 of the locking tongue is blunt and is preferably straight or, in other words, parallel to the bend 10.

Referring now to Fig. 1 of the drawings, it will be observed that when the washer is disposed upon the bolt 1, the forward edge of the locking tongue will rest in engagement with the flattened surface 3 of the bolt and the bend 10 will be presented toward the member to be secured which, in Fig. 1 of the drawings, is indicated at A. As the nut is rotated upon the bolt in a direction to tighten the same thereon, its face, which is presented toward the said part A, will come into contact with the forward face of the washer and as the nut is further rotated, the washer will be fed or moved along the bolt until it has been brought to position resting against the face of the said part A. Upon further rotation of the nut to tighten the same, the washer will be forced toward the said part and in such movement the portion 9 of the locking tongue will be pressed forwardly and the portion 11 of the said tongue will be forced in a corresponding direction and into engagement with the threads of the nut and between the wall of the bolt opening and the flattened surface 3, the threads of the nut cutting into the edges and side portions of the part 11 of the tongue and mutilating the same in the manner shown in Fig. 6 of the drawings.

It will now be apparent that when the washer has been forced to position lying flat against the surface of the part A, the portion 9 of the locking tongue will occupy the plane of the washer and the portion 11 of the tongue will be in the position shown in Fig. 3 of the drawings.

From the foregoing it will be obvious that due to the fact that the forward end 12 of the locking tongue barely touches the plane of the forward face of the washer, there will be no possibility of the nut locking with the tongue as the nut is rotated against the said face of the washer, until the washer has been forced against the part A.

It will be obvious that the engagement of the threads of the nut with the locking tongue and the wedging action exerted by the tongue upon the nut is such that the nut is substantially as firmly united to the bolt as if welded thereto.

Having thus described the invention, what is claimed as new is:

1. A lock washer having a bolt opening and provided at one side of the bolt opening with a locking tongue having relatively angularly disposed portions lying bodily rearwardly of the plane of the forward face of the washer and extending to a point beyond the rear face, the extremity of the tongue being presented in a general forward direction.

2. A lock washer having a bolt opening and provided at one side of the bolt opening with a locking tongue extended rearwardly and thence forwardly and toward the axis of the opening with its extremity terminating substantially at the plane of the forward face of the washer.

3. A lock washer having a bolt opening and provided at one side of the said opening with a locking tongue, the said tongue, from its juncture with the body of the washer, being extended rearwardly beyond the rear face of the washer and toward the axis of the bolt opening and thence forwardly and toward the said axis of the bolt opening, the tongue lying bodily at one side of the plane of the forward face of the washer and the extremity of the tongue terminating substantially in the said plane.

4. A lock washer having a bolt opening and provided at one side of the said opening with parallel slits, the material between the slits being struck out to form a locking tongue lying bodily at one side of the plane of one face of the washer and extending beyond the other face and having its extremity presented toward the first-named face and terminating within the bolt opening.

5. The combination with a bolt having a flattened side, of a lock washer having a bolt opening for the reception of the bolt and provided at one side of said opening with a locking tongue extending inwardly at an angle from the rear face of the washer and thence forwardly at an angle toward the forward face thereof and arranged, when disposed upon the bolt, to have its extremity rest against the said flattened portion thereof, the locking tongue being arranged by the engagement of its bend against a part secured by the bolt upon which the washer is positioned to have its forwardly projecting portion forced between the flattened side of the bolt and the wall of the bolt opening in the nut and to have threads cut in its said portion by the threads of the said nut when the nut is tightened upon the bolt and against the washer.

In testimony whereof I affix my signature in presence of two witnesses.

MILTON M. GOBLE. [L. S.]

Witnesses:
SAMUEL N. ACKER,
J. D. YOAKLEY.